US010834250B2

(12) United States Patent
Tam et al.

(10) Patent No.: US 10,834,250 B2
(45) Date of Patent: *Nov. 10, 2020

(54) MAINTAINING AN AUTOMOBILE CONFIGURATION OF A MOBILE COMPUTING DEVICE WHILE SWITCHING BETWEEN AUTOMOBILE AND NON-AUTOMOBILE USER INTERFACES

(71) Applicant: Google LLC, Mountain View, CA (US)

(72) Inventors: Jia Wei Tam, Seattle, WA (US); Lauren Wunderlich, San Francisco, CA (US); Zhongxia Yan, Davis, CA (US); Gyeong Sik Choi, Sunnyvale, CA (US); Heng Xiong, Bothell, CA (US); Bryan Jeffery Moles, Santa Clara, CA (US); Francisco Manuel Galanes, Kirkland, WA (US); Sabrina Silk Billinghurst, Mountain View, CA (US); Yuanjiao Shen, Mountain View, CA (US); Patrick Brady, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,757

(22) Filed: Jul. 30, 2019

(65) Prior Publication Data
US 2019/0356773 A1 Nov. 21, 2019

Related U.S. Application Data

(63) Continuation of application No. 16/122,474, filed on Sep. 5, 2018, now Pat. No. 10,389,870, which is a (Continued)

(51) Int. Cl.
H04M 1/00 (2006.01)
H04M 1/725 (2006.01)
(Continued)

(52) U.S. Cl.
CPC ....... *H04M 1/72577* (2013.01); *H04M 1/253* (2013.01); *H04M 1/6091* (2013.01); *H04M 1/72569* (2013.01); *H04M 2250/22* (2013.01)

(58) Field of Classification Search
CPC ............ H04M 1/72577; H04M 1/253; H04M 1/6091; H04M 2250/22
See application file for complete search history.

(56) References Cited

U.S. PATENT DOCUMENTS 8,989,961 B2 * 3/2015 Chien ............... H04M 1/72527
701/36
9,497,146 B2 11/2016 Chang et al.
(Continued)

OTHER PUBLICATIONS

Notice of Allowance from U.S. Appl. No. 15/925,336, dated Jul. 23, 2018, 10 pages.
(Continued)

*Primary Examiner* — Khai M Nguyen
(74) *Attorney, Agent, or Firm* — Shumaker & Sieffert, P.A.

(57) ABSTRACT

A device is described that, while operating in an automobile configuration, causes a vehicle system of an automobile to display part of an automobile graphical user interface (GUI) while locally displaying a different part of the automobile GUI. Responsive to receiving user input for switching to a non-automobile GUI that permits access to at least some features of the device that are restricted by the automobile GUI, the device replaces the part of the automobile GUI that is locally displayed on the device with the non-automobile GUI, all while continuing to cause the vehicle system to display its part of the automobile GUI. The device accesses the at least some features of the device and responsive to receiving user input for switching back to the automobile GUI, the device replaces the non-automobile GUI with the (Continued)

part of the automobile GUI that was previously displayed by the device.

20 Claims, 9 Drawing Sheets

Related U.S. Application Data continuation of application No. 15/925,336, filed on Mar. 19, 2018, now Pat. No. 10,097,684.

(51) Int. Cl.
*H04M 1/253* (2006.01)
*H04M 1/60* (2006.01)

(56) References Cited

U.S. PATENT DOCUMENTS

| | | | | |
|---|---|---|---|---|
| 10,097,684 | B1* | 10/2018 | Tam | H04M 1/72577 |
| 10,389,870 | B1* | 8/2019 | Tam | H04M 1/253 |
| 2011/0145863 | A1* | 6/2011 | Alsina | G06F 3/0485 |
| | | | | 725/44 |
| 2011/0246891 | A1* | 10/2011 | Schubert | G06F 9/452 |
| | | | | 715/719 |
| 2015/0288804 | A1* | 10/2015 | Kadous | G06F 21/62 |
| | | | | 455/418 |
| 2016/0088146 | A1 | 3/2016 | Ying et al. | |
| 2020/0057541 | A1* | 2/2020 | Wantland | G06F 3/04883 |

OTHER PUBLICATIONS

U.S. Appl. No. 15/925,336, by Jia Wei Tam et al., filed Mar. 19, 2018.

Prosecution History from U.S. Appl. No. 16/122,474, dated Oct. 15, 2018 through Jul. 8, 2019, 20 pp.

U.S. Appl. No. 16/122,474, by Jia Wei Tam et al., filed Sep. 5, 2018.

* cited by examiner

MAINTAINING AN AUTOMOBILE CONFIGURATION OF A MOBILE COMPUTING DEVICE WHILE SWITCHING BETWEEN AUTOMOBILE AND NON-AUTOMOBILE USER INTERFACES

RELATED APPLICATION

This application is a continuation of U.S. application Ser. No. 16/122,474, filed Sep. 5, 2018, which is a continuation of U.S. application Ser. No. 15/925,336, filed Mar. 19, 2018, now U.S. Pat. No. 10,097,684, the entire contents of each of which are hereby incorporated by reference.

BACKGROUND

Some computing devices (e.g., mobile phones) transition in and out of an automobile configuration (also sometimes referred to as "a driving mode") depending on whether the computing devices are connected to a vehicle sub-system, such as an infotainment system. For example, while operating in the automobile configuration, some mobile phones may output a driving-specific user interface that facilitates convenient access, via one or more of a vehicle sub-system and the mobile phone, to certain features of the mobile phone, such as music playback, navigation, digital assistant, or other feature. To promote safe driving, some mobile phones may "lock down" or automatically disable certain features of the mobile phone, while operating in an automobile configuration, that might otherwise be distracting to a user while the user is driving.

However, despite improving safety or providing a more convenient user interface that is tailored for driving, a mobile phone that operates with limited functionality whenever the mobile phone is operatively coupled to a vehicle sub-system may, at times, provide a frustrating user experience, particularly in instances when using the mobile phone would not likely compromise safety of a user. For example, if a mobile phone remains "locked down" even when the vehicle is parked and not moving or when a non-driving passenger is trying to use the mobile phone, the mobile phone may prevent users from accessing messages, checking social media, searching the internet, browsing media content, or otherwise using the mobile phone at the users' discretion. To use a mobile phone that is locked down, users may need to disconnect the mobile phone from a vehicle sub-system and/or provide a series of additional inputs to cause the mobile phone to exit out of a driving specific user interface.

SUMMARY

In general techniques of this disclosure are directed to enabling a computing device (e.g., a mobile phone) to provide an automobile user interface (UI) that facilitates user access to otherwise restricted features of the computing device, while the computing device continues to operate in an automobile configuration (also sometimes referred to as operating in "a driving mode"). The automobile UI may include protections that "lock down" and prevent access to particular features of the computing device that the computing device determines might be distracting to a user while the user is driving. For features that remain "unlocked", the automobile UI may include UI elements that promote safe interactions with the unlocked features. Since a user may, at their discretion, still want to access locked features of the computing device while the computing device is operating in an automobile configuration, the computing device includes one or more intuitive controls in the automobile UI that allow users to bypass at least some of the protections of the automobile UI, to gain access to a non-automobile UI from which the otherwise locked down features can be accessed. In the case of a distributed automobile UI (e.g., the automobile UI is provided via multiple displays, speakers, microphones, and other components of both the computing device and the vehicle in which the computing device is located), the computing device, while simultaneously outputting the non-automobile UI at the computing device and the automobile UI at the vehicle, may gracefully control inputs and outputs to the vehicle and computing device so as to ensure that the automobile UI and the non-automobile UI function as expected. The computing device may also provide controls for re-enabling the protections of the automobile UI when the user is finished and wants to return to the automobile UI.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over whether information is collected about the user and how such information, if collected, may be used by the computing device and/or computing system.

In one example, a method is described for maintaining an automobile configuration of a mobile computing device while switching between an automobile graphical user interface and a non-automobile graphical user interface. The method includes, while operating in the automobile configuration, outputting, by the mobile computing device, for display by a vehicle system of an automobile, a first portion of the automobile graphical user interface, and displaying, by the mobile computing device, a second portion of the automobile graphical user interface that restricts access to at least some features of the mobile computing device. The method further includes responsive to receiving a first user input for switching to a non-automobile graphical user interface that permits access to the at least some features of the mobile computing device that are restricted by the automobile graphical user interface, replacing the second portion of the automobile graphical user interface with the non-automobile graphical user interface while continuing to output the first portion of the automobile graphical user interface for display by the vehicle system. The method further includes accessing, by the mobile computing device, the at least some features of the mobile computing device while continuing to output the first portion of the automobile graphical user interface for display by the vehicle system, and responsive to receiving a second user input for switching back to the automobile graphical user interface, replacing the non-automobile graphical user interface with the second portion of the automobile graphical user interface.

In another example, a computing device is described that includes a display component, and at least one processor configured to perform operations while the computing device operates in an automobile configuration that include: outputting, for display by a vehicle system of an automobile, a first portion of an automobile graphical user interface, and outputting, for display by the display component, a second portion of the automobile graphical user interface that restricts access to at least some features of the computing device. The operations further include responsive to receiving a first user input for switching to a non-automobile graphical user interface that permits access to the at least some features of the computing device that are restricted by the automobile graphical user interface, replacing the second portion of the automobile graphical user interface with the non-automobile graphical user interface while continuing to output the first portion of the automobile graphical user interface for display by the vehicle system. The operations further include accessing the at least some features of the computing device while continuing to output the first portion of the automobile graphical user interface for display by the vehicle system, and responsive to receiving a second user input for switching back to the automobile graphical user interface, replacing the non-automobile graphical user interface with the second portion of the automobile graphical user interface.

In another example, a computer-readable storage medium is described that includes instructions that, when executed by at least one processor of a mobile phone while the mobile phone operates in an automobile configuration, cause the at least one processor to display an automobile graphical user interface that restricts access to at least some features of the mobile phone. The instructions, when executed, further cause the at least one processor to responsive to receiving a first user input for switching to a non-automobile graphical user interface that permits access to the at least some features of the mobile phone that are restricted by the automobile graphical user interface, replace the automobile graphical user interface with the non-automobile graphical user interface, wherein the automobile graphical user interface with the non-automobile graphical user interface by at least overlaying on the non-automobile graphical user interface, a persistent user interface element for switching-back to the automobile graphical user interface. The instructions, when executed, further cause the at least one processor to access the at least some features of the mobile phone while continuing to operate in the automobile configuration, receive a second user input that selects the persistent user interface element for switching back to the automobile graphical user interface, and responsive to receiving the second user input, replace the non-automobile graphical user interface with the automobile graphical user interface.

In another example, a system is described that includes means for, while operating in an automobile configuration, outputting, for display by a vehicle system of an automobile, a first portion of an automobile graphical user interface, and displaying a second portion of the automobile graphical user interface that restricts access to at least some features of the system. The system further includes means receiving a first user input for switching to a non-automobile graphical user interface that permits access to the at least some features of the system that are restricted by the automobile graphical user interface. The system further includes means for replacing the second portion of the automobile graphical user interface with the non-automobile graphical user interface in response to the first user input, all while continuing to output the first portion of the automobile graphical user interface for display by the vehicle system. The system further includes means for accessing the at least some features of the mobile computing device while continuing to output the first portion of the automobile graphical user interface for display by the vehicle system. The system further includes means for receiving a second user input for switching back to the automobile graphical user interface, and means for replacing the non-automobile graphical user interface with the second portion of the automobile graphical user interface in response to receiving the second user input.

The details of one or more examples are set forth in the accompanying drawings and the description below. Other features, objects, and advantages of the disclosure will be apparent from the description and drawings, and from the claims.

DETAILED DESCRIPTION

Figure 1:
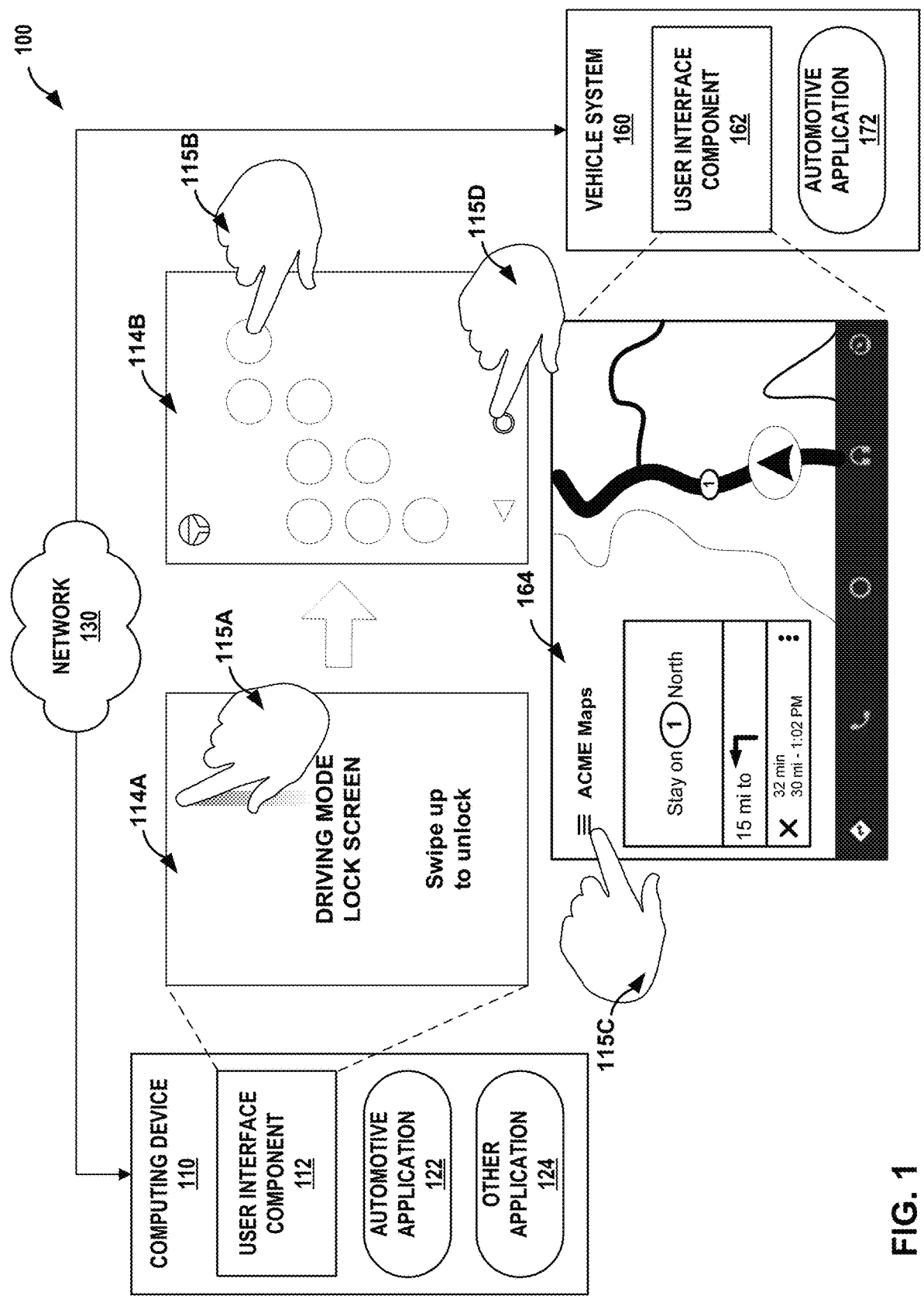
FIG. 1 is a conceptual diagram illustrating an example computing system configured to provide an automobile user interface that facilitates user access to otherwise restricted features of a computing device while the computing device continues to operate in an automobile configuration, in accordance with one or more aspects of the present disclosure.

In general techniques of this disclosure are directed to enabling a computing device (e.g., a mobile phone, a computerized watch, or other computing device) to provide an automobile user interface (UI) that facilitates user access to otherwise restricted features of the computing device, while the computing device is operating in an automobile configuration (also sometimes referred to as "a driving mode"). The computing device enables access to otherwise restricted features of the computing device without altering the functionality of the rest of the automobile UI (e.g., parts of the automobile UI that are presented at a vehicle infotainment system). As one example, the computing device may transition in and out of operating in an automobile configuration (e.g., depending on whether the computing device maintains connection to a vehicle infotainment system). While operating in the automobile configuration, the computing device may output an automobile UI that includes protections that "lock down" and prevent access to particular features of the computing device that the computing device determines might be distracting to a user while the user is driving. For features that remain "unlocked", the computing device causes the automobile UI to include UI elements (e.g., larger buttons, simplified views, larger sized text or other content, etc.) that promote safe interactions, with the unlocked features. In some examples, the automobile UI is distributed amongst multiple displays, speakers, microphones, and other components of both the computing device and the vehicle in which the computing device is located. In other examples, the computing device provides the automobile UI using only the components of the computing device.

Because a user may, at their discretion, still want to access one or more otherwise locked features of the computing device while the computing device is operating in the automobile configuration and outputting the automobile UI, the computing device includes one or more intuitive controls in the automobile UI that allow users to bypass the protections of the automobile UI to gain access to the otherwise locked down features as well as controls for re-enabling the protections of the automobile UI. For example, with the computing device continuing to operate in driving mode, the user may (after deciding it is safe to do so) provide a specific input to a touch screen of the computing device that causes the computing device to switch from displaying parts of the automobile UI to instead displaying a non-automobile UI that the computing device normally provides when not operating in driving mode. In cases where the automobile UI is distributed across components of the computing device and components of a vehicle, the computing device may continue to support the automobile UI features that are presented using the components of the vehicle even though the computing device itself is now displaying the non-automobile UI. While a user interacts with the computing device, the computing device continues to operate in driving mode and in so doing, may cause applications executing at the computing device to operate differently than if the computing device was not operating in the automobile configuration, even though the computing device is now displaying the non-automobile UI. In the case of a distributed automobile UI, the computing device preserves state information to ensure that the remaining parts of the automobile UI function as expected for the automobile configuration, even though the computing device now displays a different, non-automobile UI. After interacting with the non-automobile UI on the computing device, the user may want to return to an automobile UI (e.g., the portion of the automobile UI that was previously displayed by the computing device, or some other part of the automobile UI). Through a subsequent input, the user may cause the computing device to cease displaying the non-automobile UI and revert back to presenting the automobile UI in its entirety (e.g., on both the computing device and at the vehicle components).

In this way, the described techniques may enable a computing device, such as a mobile phone, to provide an intuitive and simple way to escape out of an automobile UI as well as an intuitive and simple way to return to the automobile UI. As such, the described techniques may improve the underlying functionality of computing device that is configured to support a user interface while operating in an automobile configuration. That is, unlike other computing devices that may indiscriminately restrict access to various features of the computing device the entire time the computing device operates in an automobile configuration, the described techniques may enable a computing device to provide a user the option of accessing at least some of the protected features, without interfering with the underlying operation of the computing device and without causing the computing device to exit out of operating in driving mode. An example computing device may continue to support a distributed automobile UI and/or continue to support driving mode functionality and maintain driving mode state information, even after a user momentarily exits out of the automobile UI. When the user returns to the automobile UI, the computing device provides a seamless transition back to driving mode. As such, the described techniques may enable a computing device to simultaneously provide an automobile UI at the infotainment system while also providing a non-automobile UI at the computing device, with each UI supporting a safe and convenient user interface that is tailored for driving, while also enabling users to, at their discretion, utilize features of the computing device that might otherwise be disabled while driving.

FIG. 1 is a conceptual diagram illustrating an example computing system configured to provide an automobile user interface that facilitates user access to otherwise restricted features of a computing device, while the computing device continues to operate in an automobile configuration, in accordance with one or more aspects of the present disclosure. System 100 operates, in accordance with the described techniques, in the context of a vehicle, such as an automobile, watercraft, truck, train, airplane, spacecraft, or the like. System 100 of FIG. 1 includes vehicle system 160 in communication, via network 130, with computing device 110. Although the features and techniques attributed to system 100 are described below as being distributed amongst vehicle system 160 and computing device 110, in other examples, the features and techniques attributed to system 100 may be performed internally, by local components of computing device 110 or vehicle system 160.

Network 130 represents any wired or wireless communications network for transmitting data between computing devices and vehicle systems, such as computing device 110 and vehicle system 160. Vehicle system 160 may exchange data, via network 130, with computing device 110 to provide a distributed, automobile user interface (UI) that is accessible to a user of computing device 110 when computing device 110 is connected to network 130. Network 130 may include one or more network hubs, network switches, network routers, or any other network equipment, that are operatively inter-coupled thereby providing for the exchange of information between message system 160 and computing device 110. Computing device 110 and vehicle system 160 may transmit and receive data across network 130 using any suitable communication techniques. Computing device 110 and vehicle system 160 may each be operatively coupled, or at least communicatively coupled, to network 130 using respective network links. The links coupling computing device 110 and vehicle system 160 to network 130 may be universal serial bus (USB), Ethernet, or other types of connections and such connections may be wireless and/or wired connections.

Vehicle system 160 includes any suitable component or components of a vehicle that is configured to provide portions of an automobile UI that is primarily being managed by a computing device while a user of the computing device is a driver or passenger of the vehicle. For example, vehicle system 160 may include an infotainment system, a vehicle head unit, a heads-up display, a vehicle dash display, a navigation system, a speaker, a microphone, a physical button, a dial, a switch, a touch pad, or any other component that could be used to receive input, provide output, or otherwise perform operations related to providing an automobile UI. Computing device 110 represents any computing device configured to provide an automobile UI, independent of or in combination with vehicle system 160. Examples of computing device 110 include a mobile phone, a tablet computer, a laptop computer, a wearable device (e.g., a computerized watch, computerized eyewear, computerized gloves, etc.), a personal digital assistants (PDA), a fitness tracker, a portable gaming system, a media player, an e-book reader, a mobile television platform, or any other type of computing device configured to provide an automobile UI.

Vehicle system 160 includes user interface component (UIC) 162 and automotive application module 172 (referred to simply as "automotive module 172"); computing device 110 includes user interface component (UIC) 112, automotive application module 122 (referred to simply as "automotive module 122"), and one or more other application modules 124. In general, unless otherwise stated, modules 122, 124, and 172 may perform operations described herein using software, hardware, firmware, or a mixture of hardware, software, and firmware residing in and/or executing at computing device 110 and vehicle system 160. Computing device 110 and vehicle system 160 may execute modules 122, 124, and 172 with multiple processors or multiple devices, as virtual machines executing on underlying hardware, as one or more services of an operating system or computing platform, and/or as one or more executable programs at an application layer of a computing platform of computing device 110 or vehicle system 160. In some examples, computing device 110 and vehicle system 160 download any of modules 122, 124, and 172 from an application repository (e.g., an app store) or other database. In some examples, computing device 110 and vehicle system 160 are preloaded with modules 122, 124, and 172 during production and prior to being provided to a user.

UIC 112 of computing device 110 functions as an input and/or output device for computing device 110 and UIC 162 functions as an input and/or output device for vehicle system 160. UIC 112 and UIC 162 may each be implemented using various technologies. For instance, UIC 112 and UIC 162 may function as input devices using presence-sensitive input screens, microphone technologies, infrared sensor technologies, or other input device technology for use in receiving user input. UIC 112 and UIC 162 may function as output devices configured to present output to a user using any one or more display devices, speaker technologies, haptic feedback technologies, or other output device technology for use in outputting information to a user. As input devices, UIC 112 and UIC 162 detects input (e.g., touch and non-touch input) from a user. Examples of user input gestures performed by a user (e.g., the user touching, pointing, and/or swiping at or near one or more locations of UIC 112 and UIC 162 with a finger or a stylus pen). As output devices, UIC 112 and UIC 162 presents information (e.g., audible, visual, and/or haptic information) to a user in the form of a user interfaces, for example, as user interfaces 114A, 114B, and 164.

Other application modules 124 include any application that executes at a computing device, such as computing device 110. Other application modules 124 may execute at an application layer of a computing platform or operating system of computing device 110. Examples of other application modules 124 include messaging applications, e-mail clients, web browsers, calendar applications, social media applications, camera applications, media playback applications, timer applications, games, fitness tracking applications, health monitoring applications, map or navigation applications, office productivity applications, virtual assistant applications, e-book reading applications, or any other type of first party or third-party application configured to execute at a computing device, such as computing device 110.

Automotive modules 122 and 172 communicate via network 130 to provide an automobile UI, to users of computing device 110 and vehicle system 160, that facilitates user access to otherwise restricted features of computing device 110, while computing device 110 is operating in an automobile configuration. Automotive modules 122 and 172 in some examples share at least some similar features and, in some examples, modules 122 and 172 provide at least some different, complimenting features. Automotive modules 122 and 172 may execute in respective operating environments of computing device 110 and vehicle system 160 so as to provide the automobile UI described herein. In some examples, application modules 122 and 172 complement each other to provide an automobile UI and as such, exchange information to provide, in collaboration, the automobile UI described herein.

For example, automotive module 172, which executes in an operating environment of vehicle system 160, may communicate with automotive module 122 which is executing in operating environment of computing device 110. While updating a non-automobile user interface displayed at UIC 112 in response to additional inputs received by computing device 110 while automotive module 122 maintains computing device 110 in an automobile configuration, automotive module 122 may send information to automotive module 172 about different inputs received by vehicle system 160. The information sent to automotive module 172 may cause, automotive module 172 to update the automobile UI 164 being displayed at UIC 162.

Automotive module 122 manages when computing device 110 transitions between operating in an automobile configuration and a non-automobile configuration. Computing device 110 may sometimes operate in a default, non-automobile configuration, for instance, when a user of computing device 110 is using computing device 110 at home, at work, while walking or exercising, or otherwise while outside of a vehicle environment. In the non-automobile configuration, computing device 110 may refrain from executing automotive module 122 and may instead, use system resources of an operating system to provide a non-automobile UI at UIC 112. For example, an operating system executing at computing device 110 may perform system-level operations related to providing a non-automobile UI at UIC 112 when computing device 110 is outside a vehicle environment or when a user provides input at computing device 110 that cause automotive module 122 to be dormant.

However, when computing device 110 is being used in a vehicle environment computing device 110 may operate in a non-automobile configuration at a user's discretion. When a user wants computing device 110 to operate in an automobile configuration, the user may provide input to UIC 112 to launch automotive module 122. In some examples, computing device 110 may operate in automobile configuration whenever computing device 110 is operatively coupled, or at least communicatively coupled, via a wired or wireless network 130 connection, to vehicle system 160 (e.g., so called "tethered mode"). In some examples, computing device 110 operates in automobile configuration despite whether computing device 110 is operatively coupled or at least communicatively coupled, via a wired or wireless network 130 connection, to vehicle system 160 (e.g., so called "non-tethered mode").

In some examples, computing device 110 may automatically, independent of user input, launch automotive module 122. For example, in response to detecting a wired or wireless connection with network 130 and/or vehicle system 160, computing device 110 may automatically execute automotive module 122 to switch computing device 110 into operating in an automobile configuration.

In the automobile configuration, automotive module 122 may be the primary component that handles the user interface of computing device 110 and automotive module 122 in combination with automotive module 172 may be the primary component that handles the user interface of vehicle system 160. Automotive module 122 may tailor particular features of computing device 110 for user safety and ease-of-use for the vehicle environment. For example, in the automobile configuration, automotive module 122 may render UI elements differently relative to how computing device 110 renders the same UI elements in a non-automobile configuration (e.g., using larger icons or text as compared to a size of icons and text being rendered in non-automobile configuration). In an automobile configuration, automotive module 122 may restrict access to at least some features of computing device 110 (e.g., by locking down various applications, menus, or other features of computing device 110 that are otherwise accessible via a UI of a non-automobile configuration), silence or modify how computing device 110 outputs notifications and alerts to minimize distractions (e.g., place computing device 110 in a "do not disturb" mode), or reconfigure computing device 110 in other ways to improve performance and ease of use, while a user is driving a vehicle.

Not to be equated with other computing devices that merely (e.g., via USB, Bluetooth®, or other type of connection) project or mirror information onto a second screen located inside a vehicle, stream audio to a music interface of an infotainment system of the vehicle, or simply lock-out features of the computing devices by displaying a lock screen, automotive modules 122 and 172 exchange information to generate an entire, system-wide automobile UI experience on behalf of system 100. That is, unlike other computing systems that include multiple devices (e.g., at a mobile phone and vehicle infotainment system) that each independently provide device-level UI experiences, automotive modules 122 and 172 cause the individual devices 110 and 160 in system 100 coordinate to provide a provide a system level UI.

In some instances, automotive modules 122 and 172 may communicate to process inputs and outputs detected by computing device 110 and vehicle system 160 to alter the presentation of the automobile UI at UIC 112 and 162. Automotive modules 122 and 172 may communicate to resolve conflict between competing input and output components (e.g., two or more speakers, two or more microphones, etc.) to provide an intuitive user experience. Automotive modules 122 and 172 may cause computing device 110 and vehicle system 160 to locally render respective UI elements of an automobile UI. That is, more so than just outputting (e.g., projecting or streaming) information for presentation via a vehicle speaker or display, automotive modules 122 and 172 communicate over network 130 to coordinate how computing device 110 and vehicle system 160 operate so as to provide a seamless automobile UI.

In operation, a user with computing device 110 may enter a vehicle containing vehicle system 160. The user may choose to operate computing device 110 in a vehicle configuration and may provide input to UIC 112 that causes computing device 110 to launch automotive module 122.

With automotive module 122 up and running, automotive module 122 may cause computing device 110 to transition from a non-automobile configuration to an automobile configuration. For example, automotive module 122 may alter the notification scheme normally used by computing device 110 so that some alerts are prevented from being output to a user and those alerts that are output to the user are presented in a way that promotes safe driving. Automotive module 122 may further promote safe driving by preventing the user from accessing certain features of computing device 110 when in automobile configuration.

While operating in the automobile configuration, automotive module 122 may output, for display by UIC 162 of vehicle system 160, UI 164 as a first portion of an automobile UI and may display, at UIC 112, UI 114B as a second portion of the automobile UI that restricts access to at least some features of computing device 110. For example, automotive module 122 may cause UIC 112 to display UI 114A, and automotive module 122 may cause automotive module 172 to display UI 164 at UIC 162.

UI 114A is a lock screen of computing device 110 for restricting a user from accessing UI 114B which is a non-automobile UI of computing device 110. UI 114A further restricts a user from accessing the various features of computing device 110 (e.g., messaging applications, social media accounts, etc.) that are accessible from non-automobile UI 114B. Computing device 110 may independently display automobile UI 114A or non-automobile UI 114 while simultaneously outputting automobile UI 164 for display by vehicle system 160. That is, UI 164 is a navigation or map UI that is output by automotive module 172 via commands, instructions, and other information (e.g., data) received from automotive module 122. Vehicle system 160 and computing device 110 process inputs detected by UIC 162 as a user interacts with UI 164. Computing device 110 further processes inputs detected by UIC 112 as a user interacts with UI 114.

Further, while operating in the automobile configuration, computing device 110 may receive first user input 115A for switching to a non-automobile UI 114B that permits access to the at least some features of computing device 110 that are restricted by automobile UI 114A. For example, a non-driving passenger of the vehicle or a driving passenger of the vehicle when the vehicle is parked, may want to access content of the computing device 110 that is normally locked-out by automotive module 122 when operating in the automobile configuration. UIC 112 may detect first user input 115A (e.g., a series of tap gestures that input a pin, a linear shaped swipe, a curved swipe, a swipe-up or down, a swipe-left or right, a voice command, a shake, or any other type of user input that is detectable by UIC 112. Automotive module 122, while managing UI 114A, may receive data indicative of first user input 115A and determine that user input 115A includes characteristics that indicate first user input 115A is a command to escape UI 114A to a non-automobile UI 114B.

In response to first user input 115A, and further while operating in the automobile configuration, automotive module 122 of computing device 110 may replace UI 114A with UI 114B while continuing to output UI 164 for display by vehicle system 160. For example, automotive module 122 may send instructions to UIC 112 that cause UIC 112 to replace UI 114A with UI 114B. However, automotive module 122 may continue to cause automotive module 172 render and output for display UI 164 at UIC 162. In this way, automotive module 122 maintains computing device 110 in an automotive configuration by outputting a partial automobile UI for display at vehicle system 160 while providing access to otherwise restricted content by displaying a non-automobile UI at UIC 112.

UI 114B includes selectable graphical elements (e.g., icons) associated with other application modules 124 or other components of computing device 110. While displaying UI 114B while computing device 110 operates in the automobile configuration, users can interact with other application modules 124 and other features of computing device 110 that are normally accessible if computing device 110 were operating in non-automobile configuration. However, because computing device 110 is merely presenting a non-automobile UI while continuing to operate in automobile configuration, automotive module 122 may cause certain ones of other application modules 124 and features of computing device 110 to behave differently than if computing device 110 were operating in the non-automobile configuration. For example, automotive module 122 may refrain from presenting some notifications in UI 114B while operating in an automobile configuration that might be otherwise presented in UI 114B if computing device 110 were operating in a non-automobile configuration. Automotive module 122 may render UI elements of UI 114B at UIC 112 according to an automotive style (e.g., larger-sized font, larger sized elements, a particular color pallet, etc.) that is different than a non-automotive style used to render and present the UI elements of UI 114B when computing device 110 is not operating in an automobile configuration.

While operating in an automobile configuration and displaying a non-automobile UI, automotive module 122 of computing device 110 may grant access to, or in some cases access, the at least some features of computing device 110 while continuing to output UI 164 for display by vehicle system 160. For instance, a user may provide inputs one or more inputs 115B to UIC 112 to select a graphical element for launching an e-mail application from other application modules 124. UIC 112 may detect user inputs 115B at or near a location of UIC 112 at which the graphical element associated with the e-mail application from other application modules 124 is displayed. Automotive module 122 may receive, from UIC 112, information about user inputs 115B detected by UIC 112 and process user inputs 115B so as to provide access to the e-mail application or otherwise permit access to the various features and components of computing device 110 that might be hidden from view, or otherwise restricted, in UI 114A.

While the user provides user inputs 115B at computing device 110, automotive module 122 may further determine, from communicating with automotive module 172, that a user is simultaneously providing user inputs 115C at UI 164. Automotive module 122 may receive, from vehicle system 160, information about user inputs 115C detected by UIC 162 and process user inputs 115C so as to support automotive module 172 in outputting UI 164 for display.

In this way, automotive module 122 configures computing device 110 to simultaneously drive two different UIs while operating in an automobile configuration. Automotive module 122 provides access to non-automobile UI 114B while simultaneously controlling automotive module 172 to display automobile UI 164. By simultaneously controlling UI 114B and UI 164, automotive module 122 is doing more than some other devices that merely outputting a UI locally while projecting or streaming video or audio of the same local UI to a speaker or screen of a vehicle system. By driving two different UIs simultaneously, automotive module 122 maintains computing device 110 in the automobile configuration so as to continue to support UI 164 while also facilitating convenient access to content and features that would otherwise be restricted when outputting UI 164. For example, a non-driving passenger of the vehicle can interact directly with computing device 110 to access certain content via user interface 114B, while a driving passenger of the vehicle can maintain operational safety by being able to interact directly (via vehicle system 16) with computing device 110 via user interface 164. In addition, by remaining in automobile configuration while presenting automobile UI 164 and non-automobile UI 114B, various safety features and other configuration settings related to operating computing device 110 in the automobile configuration remain, which may further improve user safety.

Further while operating in the automobile configuration, computing device 110 may receive user input 115C for switching from UI 114B back to automobile UI 114A. For example, after a time-out period of not detecting any user inputs at computing device 110, or in response to a particular user input detected by computing device 110 while UI 114B is displayed, application module 122 may lock-down computing device 110 and revert back to UI 114A to again restrict access to some features of computing device 110. In some examples, user input 115D includes: a series of tap gestures (e.g., to input a pin), a linear shaped swipe, a curved swipe, a swipe-up or down, a swipe-left or right, a voice command, a shake, or any other type of user input that is detectable by UIC 112. In the example of FIG. 1, the user may provide user input 115D at a location of UIC 112 at which a home button of UI 114B is displayed. Automotive module 122, while managing UI 114B may receive data indicative of user input 115D and determine that user input 115D includes characteristics that indicate user input 115D is a command to escape the non-automobile UI 114B to return to the automobile UI 114A. Response to user input 115D, and further while operating in the automobile configuration, automotive module 122 of computing device 110 may replace non-automobile UI 114B with UI 114A.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

Figure 2:
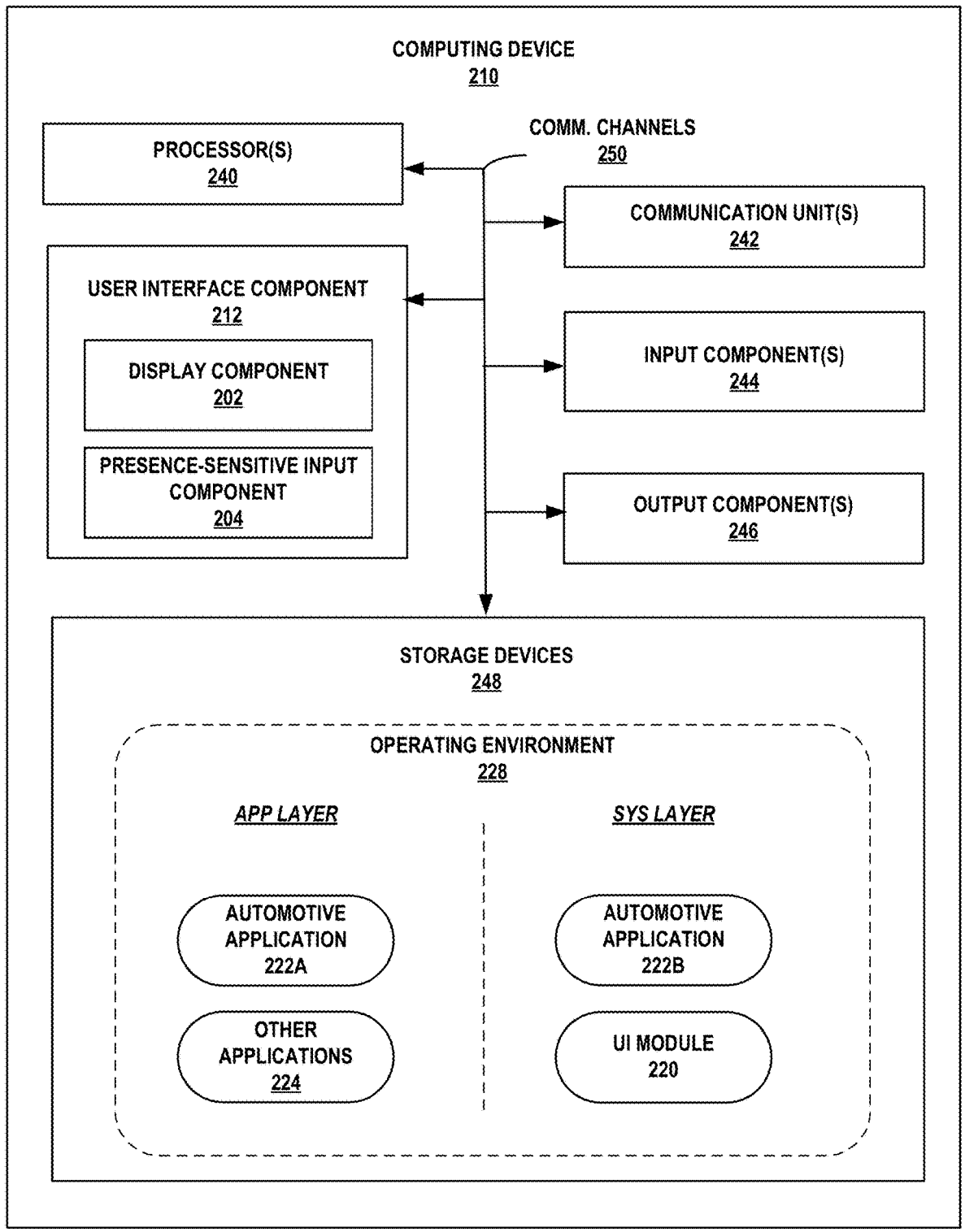
FIG. 2 is a block diagram illustrating an example computing device that is configured to provide an automobile user interface that facilitates user access to otherwise restricted features of the computing device while the computing device continues to operate in an automobile configuration, in accordance with one or more aspects of the present disclosure.

FIG. 2 is a block diagram illustrating an example computing device that is configured to provide an automobile user interface that facilitates user access to otherwise restricted features of the computing device, while the computing device continues to operate in an automobile configuration, in accordance with one or more aspects of the present disclosure. Computing device 210 of FIG. 2 is described below as an example of computing device 110 of FIG. 1. FIG. 2 illustrates only one example of computing device 210, and many other examples of computing device 210 may be used in other instances. Computing device 210 may include a subset of the components included in FIG. 2 or may include additional components not shown in FIG. 2.

As shown in the example of FIG. 2, computing device 210 includes UIC 212, one or more processors 240, one or more communication units 242, one or more input components 244, one or more output components 246, and one or more storage components 248. UIC 212 includes display component 202 and presence-sensitive input component 204. Storage components 248 of computing device 210 includes UI module 220, automotive application modules 222A and 222B (referred to collectively as "automotive module 222"), and other application modules 224. Modules 222, 224, and 226 are part of operating environment 228 of storage component 248.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a UID), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 210 may generate output. Examples of output are tactile, audio, and video output. Output components 246 of computing device 210, in one example, includes a UID, sound card, video graphics adapter card, speaker, cathode ray tube (CRT) monitor, liquid crystal display (LCD), or any other type of device for generating output to a human or machine.

UIC 212 of computing device 210 may be similar to UIC 112 of computing device 110 and includes display component 202 and presence-sensitive input component 204. Display component 202 may be a screen at which information is displayed by UIC 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device.

Modules 220, 222, and 224 may be operable by processors 240 to perform various actions, operations, or functions of computing device 210. For example, processors 240 of computing device 210 may retrieve and execute instructions stored by storage components 248 that cause processors 240 to perform the operations modules 220, 222, 224, 226, and 228. The instructions, when executed by processors 240, may cause computing device 210 to store information within storage components 248.

One or more storage components 248 within computing device 210 may store information for processing during operation of computing device 210 (e.g., computing device 210 may store data accessed by modules 220, 222, 224, 226, and 228 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated modules 220, 222, 224, 226, and 228. Storage components 248 may include a memory configured to store data or other information associated with modules 220, 222, 224, and 228.

Operating environment 228 represents a system software component of computing device 210 that manages computer hardware, firmware, and software resources and provides common services for computer programs and applications that execute at computing device 210. Operating environment 228 provides a platform on which other software operates. Examples of operating environment include an operating system, a computing platform, computational science software, a game engine, an industrial automation system, and software as a service application, to name a few.

Operating environment 228 may include multiple layers. As shown in FIG. 2, operating environment 228 includes an application (APP) layer and a system (SYS) layer. The APP layer of operating environment 228 provides a platform for automotive module 222A and other application modules 224. The APP layer may execute first party applications, third party applications, and other software applications. The SYS layer of operating environment provides a platform where privileged services and applications execute. SYS layer includes automotive modules 222B and UI module 220 as two examples of privileged services or applications executing in operating environment 228.

When computing device 210 operates in non-automobile configuration, UI module 220 of computing device 210 independently controls UIC 212 including determining what UIC 212 presents and what information is exchanged between UIC 212 and other applications or components of computing device 210. For example, in controlling what UIC 112 displays using display component 202, UI module 220 may receive information from a component of computing device 220, such as an operating system for generating a non-automobile user interface, and elements thereof. In response, UI module 220 may output instructions and information to UIC 212 that cause UIC 212 to display the non-automobile user interface at display component 202 and according to the information received from automotive module 222. When handling input detected by UIC 212, UI module 220 may receive information from UIC 212 in response to inputs detected at locations of presence-sensitive input component 204 that correspond to locations of display component 202 at which elements of a user interface are displayed. UI module 220 disseminates information about inputs detected by UIC 212 to other components of computing device 210 for interpreting the inputs and for causing computing device 210 to perform one or more functions in response to the inputs. UI module 220 may receive instructions for displaying a user interfaces via communication channels 250. UI module 220 may transmit display commands and data over communication channels 250 to cause UIC 212 to present user interfaces at UIC 212.

In some examples, UI module 220 may receive an indication of one or more user inputs detected at UIC 212 and may output information about the user inputs to messaging client module 222 or any other application or component of computing device 210 for which the user inputs are intended. For example, UIC 212 may detect a user input and send data about the user input to UI module 220. UI module 220 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input.

Based on location information of the touch events generated from the user input, UI module 220 may determine that the detected user input is associated with one or more of application modules 124 and may send an indication of the one or more touch events to application modules 124 for further interpretation.

Automotive modules 222 may perform similar operations described above relative to automotive module 122. Automotive modules 222 may be divided amongst two components. A first component of automotive modules 222 is automotive module 222A and a second component of automotive modules 222 is automotive module 222B.

Automotive module 222A executes at the APP layer of operating environment 228 and therefore executes with similar privileges as other application modules 124 executing at computing device 210. Automotive module 222A may handle a majority of tasks and perform a preponderance of operations described herein for providing an automobile UI, particularly when providing aspects of the automobile UI that are output or displayed locally by computing device 110. Automotive module 222A may exchange, with automotive module 222B, inter-process communications that transcend layers of operating environment 228. Automotive modules 222A may exchange information with other application modules 224 that rely on such communication for implementing their own respective driving modes.

Automotive module 222B may execute in SYS layer of operating environment 228. By being in the SYS layer, as opposed to executing in the APP layer of operating environment 228, automotive module 222B executes with special permissions associated with the SYS layer. Some benefits of operating in the SYS layer may be that these special permissions may enable automotive component 222B to access privileged application programing interfaces (APIs) that are only available to system level resources, such as UI module 220, a telephone-function API, or other APIs and system level components needed by automotive module 222B to provide an automobile UI. Automotive modules 222A may exchange information with UI module 220 and other system services that rely on such communication for maintaining an automobile configuration.

In some cases, automotive module 222A and 222B rely on each other to perform techniques described herein. Even though automotive modules 222 may appear to function as a single application, operating environment 228 treats automotive module 222A separate from automotive module 222B. For example, operating environment 228 may assign each of automotive modules 222 its own respective processes. As such, operating environment 228 may enable inter-process communications between automotive modules 222 by permitting automotive modules 222 to access to first party APIs and/or Intents of operating environment 228 for performing inter-process communications. For example, automotive module 222B may communicate, via inter-process communication that transcends between the SYS and APP layers of operating environment 228, with automotive module 222A.

When computing device 210 operates in an automobile configuration, UI module 220 of computing device 210 may no longer independently control UIC 212 including determining what UIC 212 presents and what information is exchanged between UIC 212 and other applications or components of computing device 210. Instead, UI module 220 may rely on automotive modules 222 to do some additional operations on behalf of UI module 220, at least to provide UI module 220 with instructions for controlling UIC 212 to be consistent with the automobile UI that automobile module 222 provides at UIC 212 and other components of a vehicle system.

For example, in controlling what UIC 212 displays using display component 202, UI module 220 may receive information from automotive module 222B for generating an automobile user interface, and elements thereof. In response, UI module 220 may output instructions and information to UIC 212 that cause UIC 212 to display the automobile user interface at display component 202 and according to the information received from automotive module 222B (which may be based on information automotive module 222B receives from automotive module 222A).

In some examples, automotive module 222B has privileges sufficient for controlling UIC 212 directly. For example, rather than rely on UI modules 220 to cause UIC 212 to display an automobile UI, automotive module 222B may output instructions and information to UIC 212 that cause UIC 212 to display the automobile user interface at display component 202 and according to the information received from automotive module 222A.

Automotive module 222B may control other system components of computing device 210. For example, with access to some system level resources, such as a telephone API, automotive module 222B can control, on a user's behalf, whether a phone conversation is carried out entirely on computing device 210, entirely on a vehicle system, such as vehicle system 160, or on a combination of computing device 210 and vehicle system 160.

FIGS. 3A through 3D are conceptual diagrams illustrating example graphical user interfaces of an example computing device that is configured to provide an automobile user interface that facilitates user access to otherwise restricted features of the computing device, while the computing device continues to operate in an automobile configuration, in accordance with one or more aspects of the present disclosure. FIGS. 3A through 3D are described below in the context of system 100 of FIG. 1 and computing device 210 of FIG. 2. FIGS. 3A through 3D include graphical user interface (GUI) 314A through 314H being displayed by computing device 310.

Figure 3A:
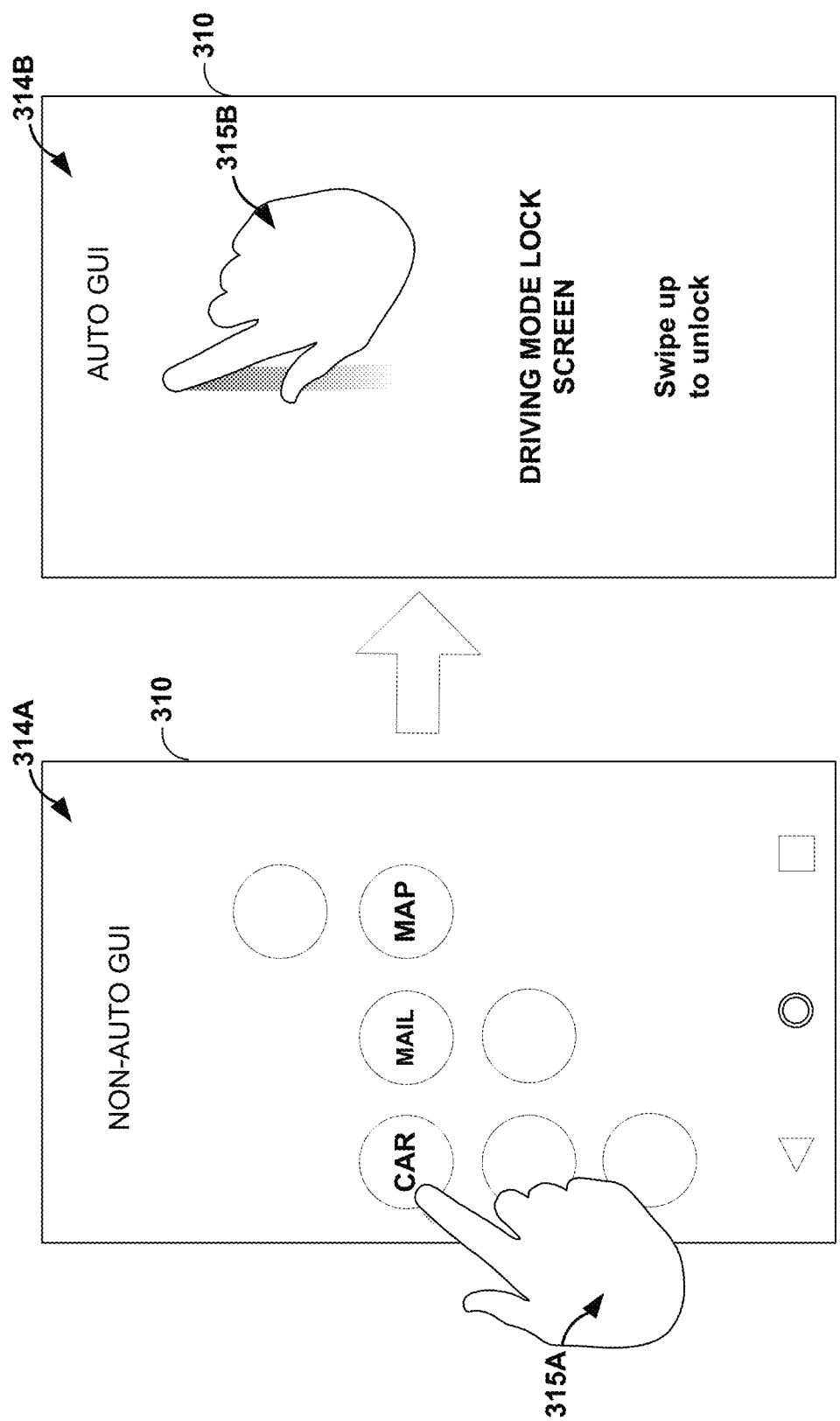
FIGS. 3A through 3D are conceptual diagrams illustrating example graphical user interfaces of an example computing device that is configured to provide an automobile user interface that facilitates user access to otherwise restricted features of the computing device while the computing device continues to operate in an automobile configuration, in accordance with one or more aspects of the present disclosure.

In the example of FIG. 3A, while computing device 310 displays non-automobile GUI 314A, a user of computing device 310 provides input 315A that launches an automotive application executing at computing device 310, such as automotive modules 122, 222. In response to receiving input 315A, computing device 310 launches the automotive application which causes computing device 310 to transition from operating in a non-automobile configuration to operating in an automobile configuration. In addition, in response to receiving input 315A, computing device 310 replaces non-automobile GUI 314A with automobile GUI 314B. As a user operates a moving vehicle relying on functions of computing device 310 as computing device 310 operates in automobile configuration, he or she may wish to access various content of computing device 310 that was previously accessible from non-automobile GUI 314A and that is hidden or protected via automobile GUI 314B. The user may provide user input 315B (e.g., a swipe-up gesture, other swipe gesture, shake gesture, squeeze gesture, etc.) to cause computing device 310, while remaining in automobile configuration, display non-automobile GUI 314A.

Figure 3B:
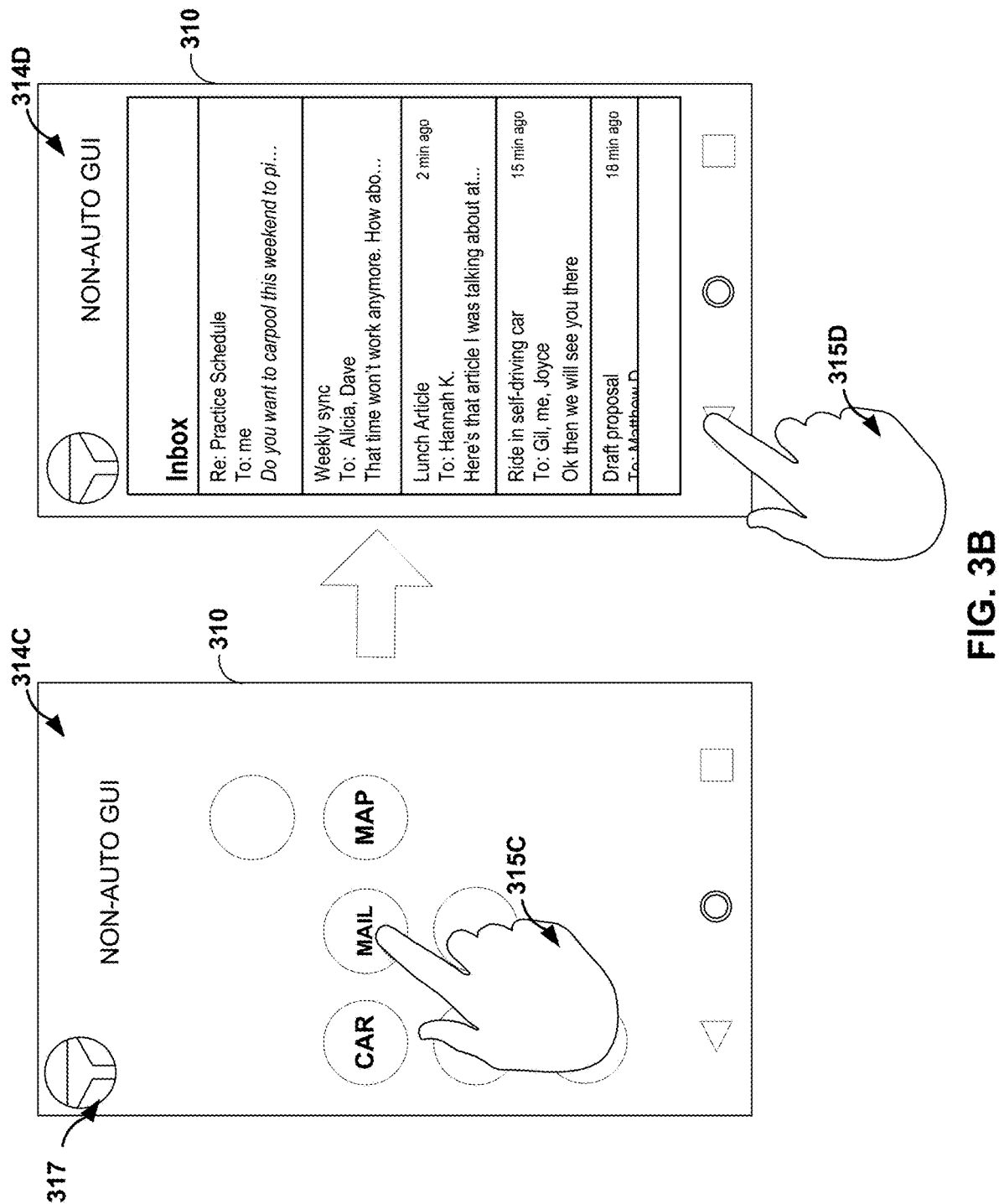

As shown in FIG. 3B, computing device 310 may, while operating in automobile configuration, displaying a home screen GUI as an example non-automobile GUI 314C. Non-automobile GUI 314C includes graphical element 317 (e.g., an icon of a steering wheel) to indicate to a user that computing device 310 is operating in automobile configuration.

Once escaped from the automobile GUI 314B to non-automobile GUI 314C, computing device 310 permits user access to features of computing device 310 similar to if computing device 310 were displaying GUI 314C while operating in non-automobile configuration, however any unique configuration settings (e.g., silencing certain notifications or alerts, etc.) may remain consistent with operating in automobile configuration. For example, computing device 310 may display enlarged notifications, etc.

From non-automobile GUI 314C, a user may provide input 315C to computing device 310 that causes computing device 310 to replace non-automobile GUI 314C with GUI 314D. For example, a user may select a mail or messaging application icon from GUI 314C. Computing device 310 may display an inbox associated with the mail or messaging application executing at computing device 310. After detecting additional user input 315D to go back to the previous screen of computing device 310, computing device 310 may replace GUI 314D with GUI 314E of FIG. 3C.

Figure 3C:
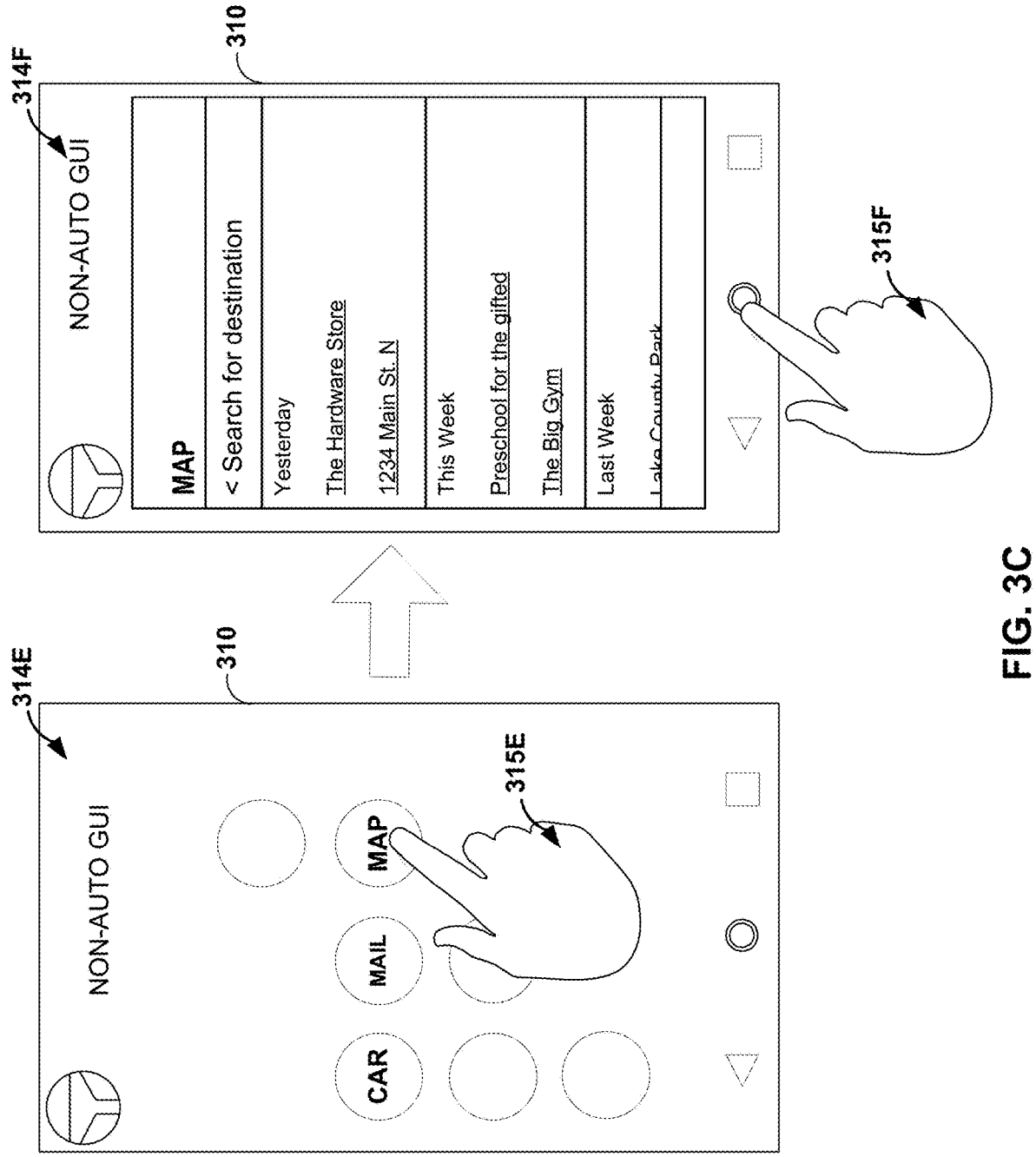

As shown in FIG. 3C, a user may provide input 315E to computing device 310 that causes computing device 310 to replace non-automobile GUI 314E with GUI 314F. For example, a user may select a map application icon from GUI 314E. Computing device 310 may display recent destinations associated with a map application executing at computing device 310.

In some examples, computing device 310 may execute at least one application that is configured to operate in an automobile mode while computing device 310 operates in the automobile configuration, and is configured to operate in a non-automobile mode while the computing device 310 operates in a non-automobile configuration. In such cases, after replacing an automobile GUI with a non-automobile GUI, the at least one application continues operating in the automobile mode. For example, if prior to displaying non-automobile GUI 314E, computing device 310 executed the map application which was ran in automobile mode. Then after displaying non-automobile GUI 314E and GUI 314F, the map application may execute in its own internal automobile mode, as opposed-to a non-automobile mode, even though computing device 310 is displaying a non-automobile GUI.

As further shown in FIG. 3C, the user may provide input 315F to revert back to the automobile GUI. That is, while operating in automobile configuration, computing device 310 may cause selections of a home button, that traditionally brings user focus back to a home screen GUI, may instead cause computing device 310 to display an automobile GUI. An input, such as input 315F, that transitions computing device 310 from displaying a non-automobile GUI to displaying an automobile GUI may cause computing device 310 to display an automobile home screen, an automotive lock screen, a previously viewed automobile screen, a predicted automobile screen based on context (e.g., a particular application GUI that computing device 310 deems is likely to be required when switching back to an automobile GUI), or some other view of the automobile GUI.

Figure 3D:
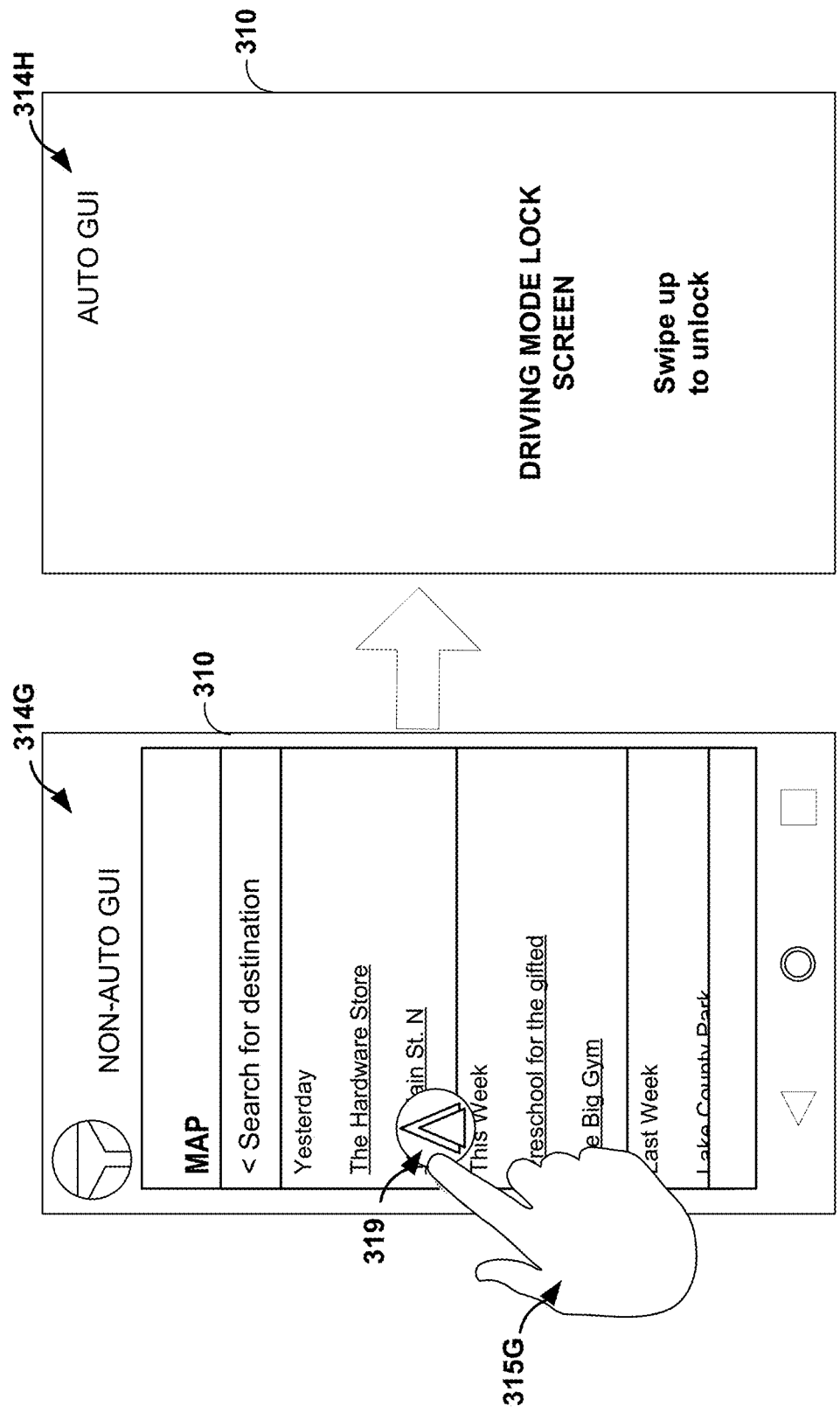

Turning to FIG. 3D, in some cases, computing device 310, rather than or in addition to mapping a home screen UI element to a command to return to an automobile GUI, computing device 310 displays persistent GUI element 319 that is most always on-top or visible from the non-automobile GUI. GUI element 319 includes a persistent user interface element for switching-back to the second portion of the automobile graphical user interface. Even if the user launches and uses a different app, the bubble will persist and be visible on the screen on top of the other apps content. This bubble service as a reminder to users that the automotive application is still executing as a background service, also provides a shortcut (e.g., a double-tap, or single tap target) for user to return to an automobile GUI. GUI element 319 may appear to be at least partially transparent, or may be solid colored. GUI element 319 may have a bubble appearance or may appear to have two-dimensional or three-dimensional shape. Computing device 310 may display GUI element 310 overlaid on non-automobile GUI 314G. Computing device 310 may recognize user input 315G as a selection of GUI element 319 and in response, replace non-automobile GUI 314G with automobile GUI 314H. As such, GUI element 319 creates a unique reminder affordance to help user return back to the Android Auto app, especially when driving.

In some examples, upon detecting a first selection of GUI element 316, the automotive application executing at computing device 310 may open a drawer or display a list of additional icons or selectable elements, each representing a different possible action for computing device 310 to perform as the non-automobile GUI 314G is replaced by automobile GUI 314H. For example, possible actions may include switching-on or switching-off a speaker of computing device 310, muting a microphone of computing device 310, disabling a camera, muting one form of input or output to enable a different form of input or output, pausing music, or exiting the automobile application rather than returning to the automobile GUI.

Figure 4A:
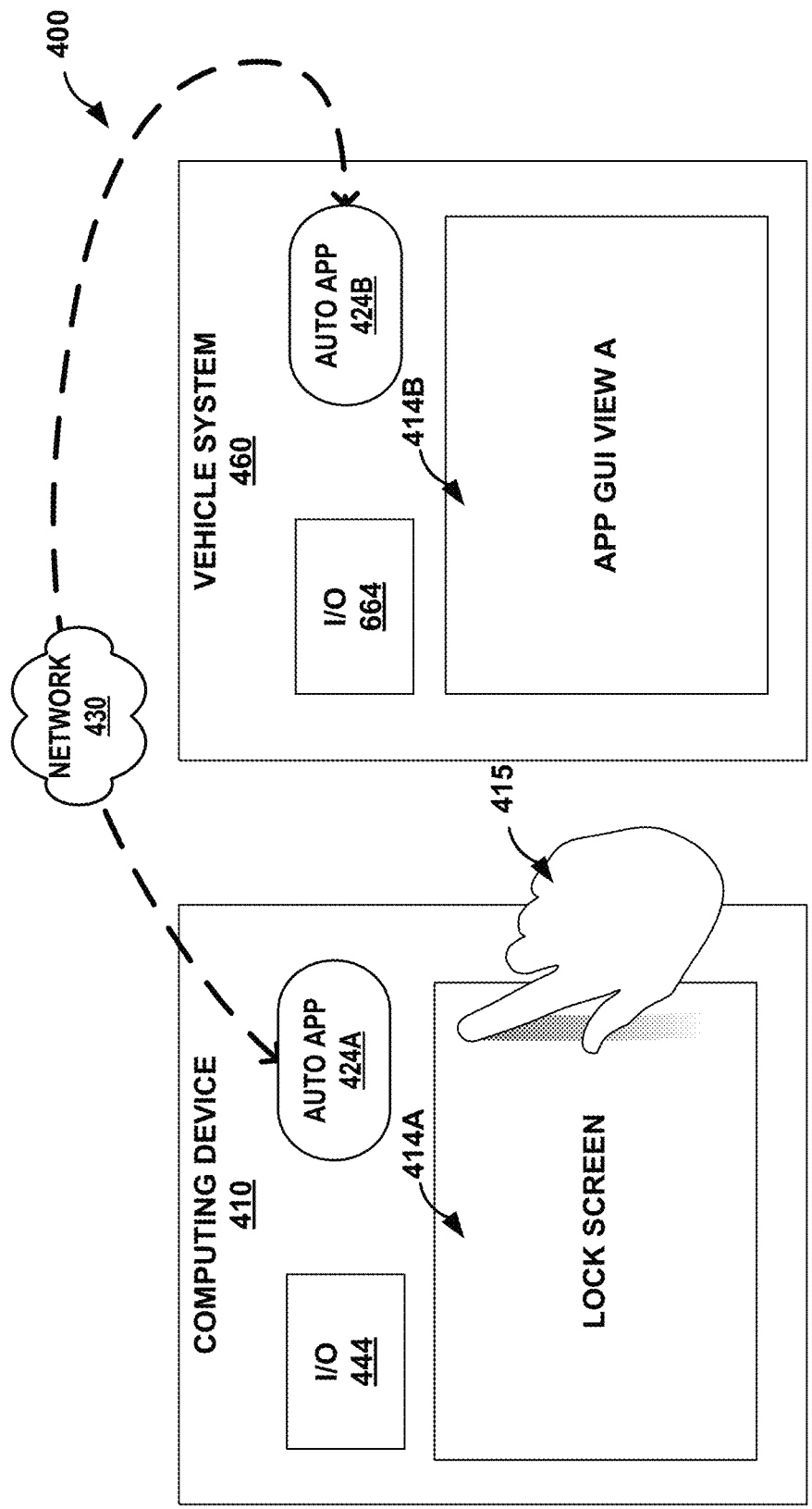
FIGS. 4A and 4B are conceptual diagrams illustrating example computing systems configured to provide an automobile user interface that facilitates user access to otherwise restricted features of a computing device while the computing device continues to operate in an automobile configuration, in accordance with one or more aspects of the present disclosure.
Figure 4B:
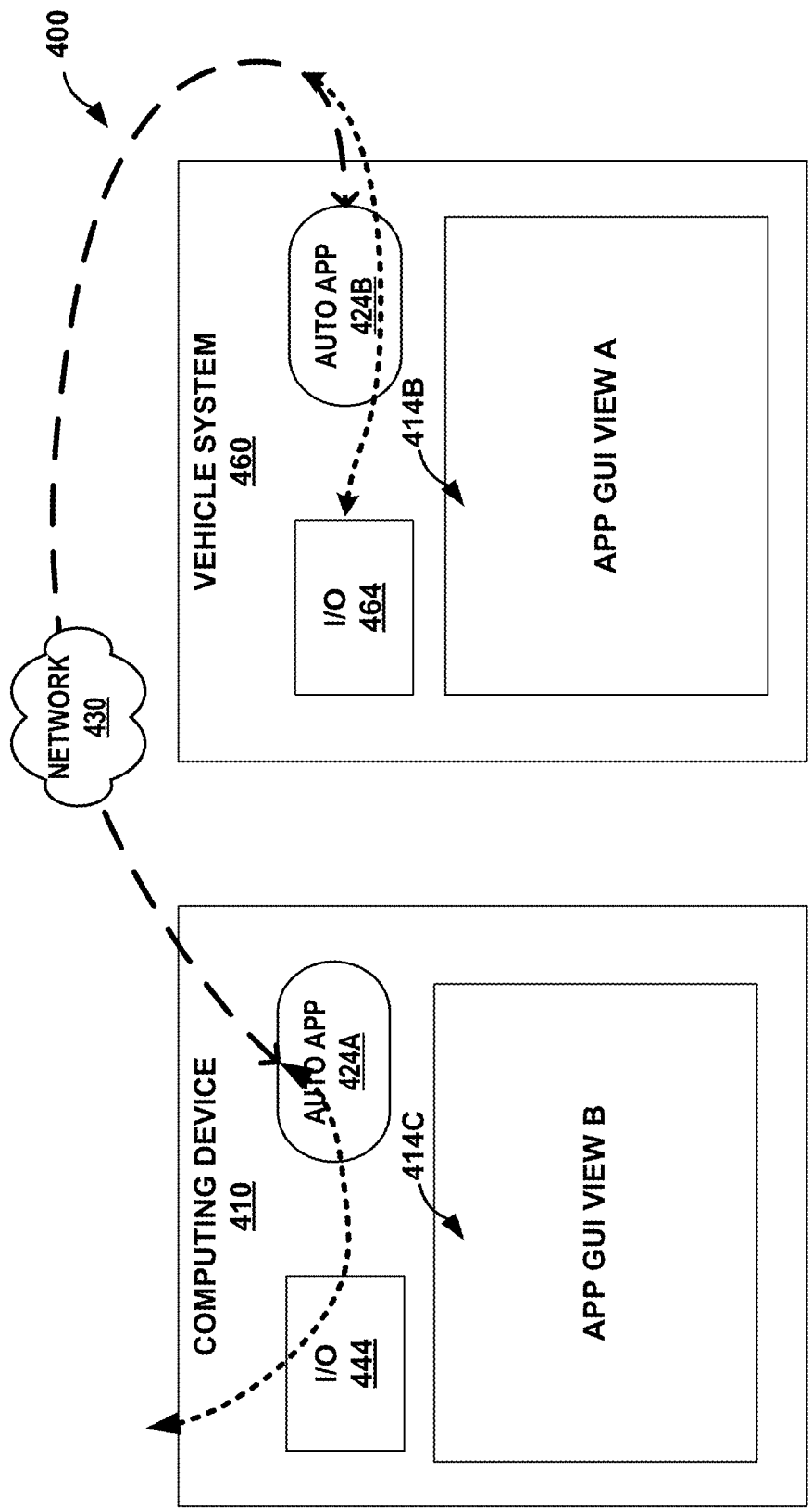

FIGS. 4A and 4B are conceptual diagrams illustrating example computing systems configured to provide an automobile user interface that facilitates user access to otherwise restricted features of a computing device, while the computing device continues to operate in an automobile configuration, in accordance with one or more aspects of the present disclosure. FIGS. 4A and 4B are described below in the context of system 100 of FIG. 1, computing device 210 of FIG. 2, and computing device 310 of FIGS. 3A through 3D.

System 400 includes computing device 410, vehicle system 460, and network 430. Computing device 410 is an example of computing devices 110, 210, and 310. Vehicle system 460 is an example of vehicle system 160. Network 430 is an example of network 130. Computing device 410 and vehicle system 460 operate in tethered mode using one or more wired or wireless connections via network 440 to exchange data.

Computing device 410 includes input and output component 444 which is similar to input and output components 244 and 246 of FIG. 210. Vehicle system 460 includes input and output component 464 which is similar to input and output component 444.

Computing device 410 executes automotive application module 424A to provide automotive GUI 414A, which is an automobile configuration lock screen, and vehicle system 460 executes automotive application module 424B to provide automobile GUI 414B. Automotive application module 424A exchanges, via network 430, data with automotive application module 424B. For example, automotive application module 424A may drive or control content of GUI 414B by sending commands or other instructions to automotive application module 424B.

Responsive to receiving user input 415 for escaping out of automotive GUI 414A, rather than display a home screen or other non-automotive UI, automotive application module 424 may cause computing device 410 to display automotive GUI 414C. Automotive GUI 414 C maybe a second screen experience of an application executing at computing device 410 and vehicle system 460.

For instance, automotive application modules 424A and 424B may provide an interface that enables sister applications that execute simultaneously at computing device 410 and vehicle system 460 to provide a multiple screen experience. This interface may follow a message-based protocol to enable information exchange between processes executing at different hardware or one-way messages via an intent system. Using the interface of application modules 424A and 424B, applications executing at computing device 410 and vehicle system 460 can use any combination of inputs registered at either input and output components 444 and 464 to cause any combination of outputs at either input and output components 444 and 464. For example, automotive application modules 424A and 424B may determine whether to associate user inputs detected by input components of input and output components 464 with automobile GUI 414C or automotive GUI 414B. Automotive application modules 424A and 424B may determine whether to associate user inputs detected by input components of input and output components 444 with automobile GUI 414C or automotive GUI 414B.

Modules 424A and 424B assign resources using a rules-based algorithm for determining user intent of an inputs. In other examples, modules 424A and 424B may use machine learning, a neural network, or some other type of model to assign inputs and output to an appropriate surface (e.g., input and output component). For example, one rule may always associate microphone inputs as inputs to an application executing at vehicle system 160 or at least ensure that output is provided in response either at a speaker or display of input and output component 464.

Consider an example where a first instance of a map or navigation application is executing at computing device 410 to display GUI 414C and a second instance of the map or navigation application is executing at vehicle system 460 and displaying GUI 414B. In other words, a first portion of an automobile GUI includes a first application GUI of the map or navigation application executing at computing device 410 whereas a second portion of the automobile GUI includes a second application GUI of the map or navigation application executing at computing device 410 or vehicle system 460.

When a user provides inputs at input and output component 444, the map or navigation application executing at vehicle system 460 may receive information from the map or navigation application executing at computing device 410 to alter the content of GUI 414B. For example, a user may provide touch input to input and output component 444 that is registered by the map or navigation application executing at computing device 410 as a new destination input. Using the interface provided by automotive application modules 424A and 424B, the map or navigation application executing at computing device 410 may cause the map or navigation application executing at vehicle system 460 to navigate and output audible instructions via input and output component 464.

In some examples, computing device 410 may output, via one or more output components 464 of vehicle system 460, audio associated with an automobile UI and audio associated with a non-automobile UI. For example, automotive application module 424A may control input and output components 464 to provide GUI 414B for the map or navigation application executing at computing device 410 or vehicle system 460 and automotive application module 424 may control input and output components 444 to provide GUI 414C as part of the map or navigation application executing at computing device 410 or vehicle system 460. Automotive applications may exchange control information via network 140.

Consider another example where a mobile-based assistant application is executing at computing device 410 to display GUI 414C and a vehicle-based assistant application is executing at vehicle system 460 and displaying GUI 414B. While displaying GUI 414B the mobile-based assistant application may receive a voice input as an indication of a user query. For example, computing device 410 may receive, via input and output component 444 or via input and output component 446, an indication of the user query.

The mobile-based assistant application may or may not attempt to satisfy the user query by determining an answer to the query. For example, the mobile-based assistant application may refrain from determining a response to the user query and the vehicle-based assistant application executing at vehicle system 460 may instead determine the response to the query.

In some examples, a response to a query may be a command to trigger an action. For example, a user may provide a voice input to "play some music" as an indication of a query and the response to the query provided by the assistant may be an acknowledgement of the query that includes the assistant launching a media player application to play music.

In either case however, rather than output a response to the query via GUI 414C or using input and output component 444, the mobile-based assistant application may hand-off the answering duties to the vehicle-based assistant application executing at vehicle system 460. For example, the mobile-based assistant application may send the query to the vehicle-based assistant application to determine a response, as well as to output the response via input and output component 464. In this way, modules 424A and 424B help to ensure that when a user interacts with a virtual assistant executing at computing device 410, the appropriate context for the interaction is more likely to be a vehicle based conversation rather than non-vehicle based.

Figure 5:
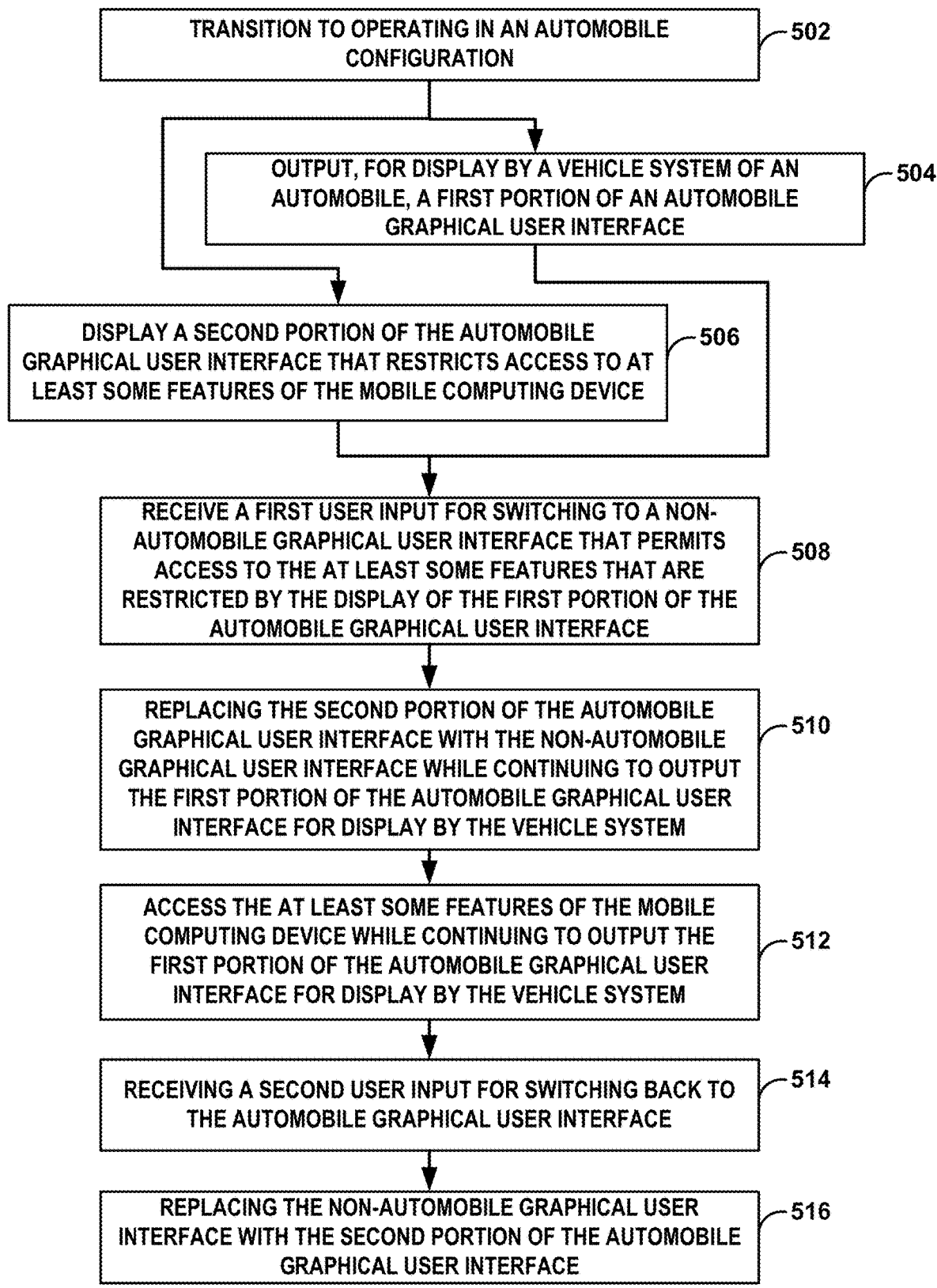
FIG. 5 is a flowchart illustrating example operations performed by an example computing device that is configured to provide an automobile user interface that facilitates user access to otherwise restricted features of the computing device while the computing device continues to operate in an automobile configuration, in accordance with one or more aspects of the present disclosure.

FIG. 5 is a flowchart illustrating example operations performed by an example computing device that is configured to provide an automobile user interface that facilitates user access to otherwise restricted features of the computing device, while the computing device continues to operate in an automobile configuration, in accordance with one or more aspects of the present disclosure. FIG. 5 is described below in the context of system 100 of FIG. 1 and computing device 210 of FIG. 2. Operations 502 through 516 of FIG. 5 may be performed in any order and may include additional or fewer operations than those shown in FIG. 5.

In accordance with techniques of this disclosure, computing device 110 may maintain an automobile configuration computing device 110 while switching between an automobile UI and a non-automobile UI. Computing device 110 may transition to operating in the automobile configuration (502). For example, a user may provide input to computing device 110 that causes computing device 110 to execute automotive module 122. Launching automotive module 122 may cause computing device 110 to execute an application process, such as automotive module 222A and a system process, such as automotive module 222B.

Computing device 110 may output, for display by a vehicle system of an automobile, a first portion of the automobile UI (504). For example, automotive module 122 may communicate with vehicle system 160 over network 130. Automotive module 122 may cause automotive module 172 to render and generate automobile UI 164 at UIC 162.

Computing device may display a second portion of the automobile UI that restricts access to at least some features of computing device 110 (506). For example, automotive module 122 may communicate indirectly or directly with UIC 112 to cause UIC 112 to display UI 114A.

Responsive to receiving a first user input for switching to a non-automobile UI that permits access to the at least some features of the mobile computing device that are restricted by the automobile UI (508), computing device 110 may replace the second portion of the automobile UI with a non-automobile UI, while continuing to output the first portion of the automobile UI for display by the vehicle system (510). For example, a user may provide a swipe-up input at a location of UIC 112 at which UI 114A is displayed. Automotive module 122 may receive information about the swipe-up input and in response, cause UIC 112 to cease displaying UI 114A and replace UI 114A with UI 114B.

Computing device 110 may access the at least some features while continuing to output the first portion of the automobile UI for display by the vehicle system (512). That is, from UI 114B, computing device 110 may allow user access to features of computing device 110 that are normally accessible only when UI 114A is not being displayed. Computing device 110 permits access to these otherwise hidden features of computing device 110 all the while continuing to operate in automotive configuration and communicating with automotive module 172 to provide UI 164 at UIC 162.

In some examples, the non-automobile UI includes one or more elements displayed in a first format that is specific to the automobile configuration of computing device 110, and in some cases, the first format is different than a second format used by computing device 110 to display the one or more elements when computing device 110 is operating in a non-automobile configuration. In other words, even though automotive module 222 may cause UIC 112 to display UI 114B to permit access to features of computing device 110 that are not easily accessible from UI 114A, automotive module 222 may cause UI 114B to appear different than it would if computing device 110 were operating in a non-automobile configuration. For example, characteristics (e.g., color, size, position, etc.) of graphical elements (e.g., text, buttons, keys, switches, windows, etc.) included in UI 114B when computing device 110 operates in an automobile configuration may be different than characteristics of corresponding graphical elements of UI 114B when computing device 110 operates in a non-automobile configuration. Similarly, applications executing at computing device 110 may perform differently (e.g., better, words, or not at all) depending on whether computing device 110 operates in an automobile or a non-automobile configuration.

Computing device 110 may receive a second user input for switching back to the automobile UI (514). For example, a user may provide a particular input at computing device 110 to cause computing device 110 to revert back to the lock screen of UI 114A. Such a user input may be a user selection of a home button in a home screen user interface. Other examples of the user input include a shake gesture performed by the user (e.g., as a user grips and shakes a housing of computing device 110), a voice command, or other input.

For example, automotive module 122 may cause a persistent graphical element to appear overlaid on top of UI 114B. In response to receiving a user input that selects the persistent graphical element, automotive module 122 may automatically revert UIC 112 back to displaying UI 114A.

In some examples, the second user input corresponds to a lack of user input over a particular time period. That is, if computing device 110 registers a lack of user interest UI 114B, computing device 110 may automatically revert back to displaying UI 114A.

Computing device 110 may, in response to receiving the second user input, replace, the non-automobile UI with the second portion of the automobile UI (516). For example, automotive module 122 may receive information about the second input and in response, cause UIC 112 to cease displaying UI 114B and replace UI 114B with UI 114A.

Clause 1. A method for maintaining an automobile configuration of a mobile computing device while switching between an automobile graphical user interface and a non-automobile graphical user interface, the method comprising, while operating in the automobile configuration: outputting, by the mobile computing device, for display by a vehicle system of an automobile, a first portion of the automobile graphical user interface; and displaying, by the mobile computing device, a second portion of the automobile graphical user interface that restricts access to at least some features of the mobile computing device; responsive to receiving a first user input for switching to a non-automobile graphical user interface that permits access to the at least some features of the mobile computing device that are restricted by the automobile graphical user interface, replacing the second portion of the automobile graphical user interface with the non-automobile graphical user interface while continuing to output the first portion of the automobile graphical user interface for display by the vehicle system; and accessing, by the mobile computing device, the at least some features of the mobile computing device while continuing to output the first portion of the automobile graphical user interface for display by the vehicle system; and responsive to receiving a second user input for switching back to the automobile graphical user interface, replacing the non-automobile graphical user interface with the second portion of the automobile graphical user interface.

Clause 2. The method of clause 1, further comprising: executing, by the mobile computing device, at least one application that is configured to operate in an automobile mode while the mobile computing device operates in the automobile configuration and is configured to operate in a non-automobile mode while the mobile computing device operates in a non-automobile configuration, wherein after replacing the second portion of the automobile graphical user interface with the non-automobile graphical user interface the at least one application continues operating in the automobile mode.

Clause 3. The method of any of clauses 1-2, wherein the mobile computing device is communicatively coupled, via a wired or wireless connection, to the vehicle system of the automobile when the mobile computing device operates in the automobile configuration.

Clause 4. The method of any of clauses 1-3, wherein the first portion of the automobile graphical user interface includes a first application graphical user interface of an application executing at the mobile computing device; and the second portion of the automobile graphical user interface includes a second application graphical user interface of the application executing at the mobile computing device.

Clause 5. The method of clause 4, wherein the first application graphical user interface corresponds to the second application graphical user interface.

Clause 6. The method of clause 4, wherein the first application graphical user interface is a primary-screen experience of the application and the second application graphical user interface is a secondary-screen experience of the application that is different than the primary-screen experience of the application.

Clause 7. The method of clause 4, further comprising: associating, by the mobile computing device, user inputs detected by input components of the vehicle system with the automobile graphical user interface; determining, by the mobile computing device, whether to associate user inputs detected by input components of the mobile computing device with the non-automobile graphical user interface or the automobile graphical user interface.

Clause 8. The method of any of clauses 1-7, wherein the first portion of the automobile graphical user interface includes a graphical portion of a user interface of a vehicle-based assistant application executing at the mobile computing device, the method further comprising: while displaying the non-automobile graphical user interface, executing, by the mobile computing device, a mobile-based assistant application; receiving, by the mobile computing device, an indication of a user query; outputting, by the mobile computing device, via the user interface of the vehicle-based assistant application, a response to the user query.

Clause 9. The method of clause 8, further comprising: refraining, by the mobile computing device, from using the mobile-based assistant application to determine the response to the user query; and determining, by the mobile computing device, using the vehicle-based assistant application, the response to the user query.

Clause 10. The method of clause 8, wherein receiving the indication of the user query comprises: receiving, by mobile computing device, from an input component of the mobile computing device, the indication of the user query.

Clause 11. The method of clause 8, wherein receiving the indication of the user query comprises: receiving, by the mobile computing device, from the vehicle system, the indication of the user input.

Clause 12. The method of any of clauses 1-11, wherein displaying the non-automobile graphical user interface comprises: displaying, by the mobile computing device, overlaid on the non-automobile graphical user interface, a persistent user interface element for switching-back to the second portion of the automobile graphical user interface; and determining, by the mobile computing device, that the second user input is a selection of the persistent user interface element.

Clause 13. The method of any of clauses 1-12, wherein the non-automobile graphical user interface includes one or more elements displayed in a first format that is specific to the automobile configuration of the mobile computing device, wherein the first format is different than a second format used by the mobile computing device to display the one or more elements when the mobile computing device is operating in a non-automobile configuration.

Clause 14. The method of any of clauses 1-13, further comprising, while displaying the non-automobile graphical user interface and continuing to output the first portion of the automobile graphical user interface for display by the vehicle system: outputting, by the mobile computing device, via one or more output components of the vehicle system, at least one of audio associated with the automobile graphical user interface or audio associated with the non-automobile graphical user interface.

Clause 15. A computing device comprising: a display component; and at least one processor configured to perform operations while the computing device operates in an automobile configuration that include: outputting, for display by a vehicle system of an automobile, a first portion of an automobile graphical user interface; and outputting, for display by the display component, a second portion of the automobile graphical user interface that restricts access to at least some features of the computing device; responsive to receiving a first user input for switching to a non-automobile graphical user interface that permits access to the at least some features of the computing device that are restricted by the automobile graphical user interface, replacing the second portion of the automobile graphical user interface with the non-automobile graphical user interface while continuing to output the first portion of the automobile graphical user interface for display by the vehicle system; accessing the at least some features of the computing device while continuing to output the first portion of the automobile graphical user interface for display by the vehicle system; and responsive to receiving a second user input for switching back to the automobile graphical user interface, replacing the non-automobile graphical user interface with the second portion of the automobile graphical user interface.

Clause 16. The computing device of clause 15, wherein the at least one processor is configured to perform the operations by executing a single operating system of the computing device.

Clause 17. The computing device of clause 16, wherein the at least one processor is further configured to perform the operations by executing an automobile application in system partition of the single operating system.

Clause 18. The computing device of clause 17, wherein the automobile application is a first instance of an automobile application and the at least one processor is further configured to perform the operations by communicating with a second instance of the automobile application executing in an execution environment of the vehicle system.

Clause 19. The computing device of clause 18, further comprising an input component, wherein the operations further include: while updating the non-automobile user interface in response to additional inputs received by the input component of the computing device, causing, by the first instance of the automobile application, based on different inputs received by the vehicle system, the second instance of the automobile application to update the first portion of the automobile graphical user interface.

Clause 20. A computer-readable storage medium comprising instructions that, when executed by at least one processor of a mobile phone while the mobile phone operates in an automobile configuration, cause the at least one processor to: display an automobile graphical user interface that restricts access to at least some features of the mobile phone; responsive to receiving a first user input for switching to a non-automobile graphical user interface that permits access to the at least some features of the mobile phone that are restricted by the automobile graphical user interface, replace the automobile graphical user interface with the non-automobile graphical user interface, wherein the automobile graphical user interface with the non-automobile graphical user interface by at least overlaying on the non-automobile graphical user interface, a persistent user interface element for switching-back to the automobile graphical user interface; access the at least some features of the mobile phone while continuing to operate in the automobile configuration; receive a second user input that selects the persistent user interface element for switching back to the automobile graphical user interface; and responsive to receiving the second user input, replace the non-automobile graphical user interface with the automobile graphical user interface.

Clause 21. A computing device comprising at least one processor configured to perform any one of the methods of clauses 1-14.

Clause 22. A computer-readable storage medium comprising instructions that when executed, cause at least one processor of a computing device to perform any one of the methods of clauses 1-14.

Clause 23. A system comprising means for performing any one of the methods of clauses 1-14.

Clause 24. A computer program comprising program instructions that, when executed on a computer, cause the computer to perform the method of any one of claims 1-14.

Clause 25. A computer product configured to perform any of the methods of clauses 1-14.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   while a mobile computing device operate in a automobile configuration:
   outputting, by the mobile computing device into a vehicle computing system of a vehicle, a first graphical user interface for an application;
   while outputting the first graphical user interface for the application to the vehicle computing system, displaying, by a display of the mobile computing device, a second graphical user interface that is different from the first graphical user interface;
   receiving, by the mobile computing device, a user input; and
   responsive to receiving the user input and while continuing to output, by the mobile computing device and to the vehicle computing system, the first graphical user interface for the application, displaying, by the display of the mobile computing device, a third graphical user interface that includes respective icons for a plurality of applications.

2. The method of claim 1, further comprising:
   while outputting the first graphical user interface for the application to the vehicle computing system:
   receiving, by the mobile computing device, a user input selecting one of the respective icons;
   executing, by the mobile computing device, an application associated with the one of the respective icons; and
   displaying, by the display of the mobile computing device, a graphical user interface for the application associated with the one of the respective icons.

3. The method of claim 2,
   wherein the display of the mobile computing device is a presence-sensitive display, and
   wherein the user input comprises a tap or double-tap gesture detected at a location of the presence-sensitive display that corresponds to a location of the presence-sensitive display at which the one of the respective icons is displayed.

4. The method of claim 1, wherein the second graphical user interface is a different graphical user interface for the application.

5. The method of claim 1, further comprising:
   after displaying the graphical user interface that includes the respective icons for the plurality of applications:
   receiving, by the mobile computing device, a user input for ceasing display of the graphical user interface that includes the respective icons; and
   ceasing to display, by the display of the mobile computing device, the graphical user interface that includes the respective icons.

6. The method of claim 5, wherein ceasing to display the graphical user interface that includes the respective icons comprises:
   displaying, by the display of the mobile computing device, a lock screen graphical user interface.

7. The method of claim 5, wherein ceasing to display the graphical user interface that includes the respective icons comprises:
   displaying, by the display of the mobile computing device, an updated graphical user interface for the application.

8. The method of claim 1, wherein the second graphical user interface is a different graphical user interface for the application.

9. The method of claim 1, wherein the second graphical user interface is a lock screen graphical user interface.

10. The method of claim 1, wherein the mobile computing device is communicatively coupled, via a wired or wireless connection, to the vehicle system when the mobile computing device operates in the automobile configuration.

11. A computing device comprising:
    a display component that displays a first graphical user interface;
    a communication unit that communicatively couples the computing device to a vehicle computing system of a vehicle; and
    at least one processor that, while the computing device operates in a automobile configuration, is configured to:
    output, to the vehicle computing system of the vehicle and via the communication unit, a second graphical user interface for an application while the display component is displaying the first graphical user interface, wherein the second graphical user interface is different from the first graphical user interface;

receive a user input; and responsive to receiving the user input and while continuing to output the second graphical user interface to the vehicle computing system, output, for display by the display component, a third graphical user interface that includes respective icons for a plurality of applications.

12. The computing device of claim 11, wherein the user input is a first user input, and wherein the at least one processor is further configured to:

while outputting the second graphical user interface for the application to the vehicle computing system:

receive a second user input selecting one of the respective icons;

execute an application associated with the one of the respective icons, wherein the application associated with the one of the respective icons is different from the application associate with the second graphical user interface; and output, for display by the display component, a graphical user interface for the application associated with the one of the respective icons.

13. The computing device of claim 11, wherein the at least one processor is further configured to:

after outputting the graphical user interface that includes the respective icons for the plurality of applications:

receive a user input for ceasing display, by the display component, of the graphical user interface that includes the respective icons; and cease outputting, to the display component for display, the graphical user interface that includes the respective icons.

14. The computing device of claim 11, wherein the at least one processor is configured to cease outputting the graphical user interface that includes the respective icons by being configured to:

output, for display by the display component, a lock screen graphical user interface; or output, for display by the display component, an updated graphical user interface for the application.

15. The computing device of claim 11, wherein the first graphical user interface is a different graphical user interface for the application or a lock screen graphical user interface.

16. A computer-readable storage medium encoded with instructions that, when executed, cause one or more processors of a computing device to:

output, to a vehicle computing system of a vehicle, a first graphical user interface for an application;

while outputting the first graphical user interface for the application to the vehicle computing system, output, for display by a display of the computing device, a second graphical user interface that is different from the first graphical user interface;

receive an indication of a user input; and responsive to receiving the indication of the user input and while continuing to output, to the vehicle computing system, the first graphical user interface for the application, output, for display by the display of the computing device, a third graphical user interface that includes respective icons for a plurality of applications.

17. The computer-readable storage medium of claim 16, wherein the instructions further cause the one or more processors to:

while outputting the first graphical user interface for the application to the vehicle computing system:

receive an indication of a second user input selecting one of the respective icons;

execute an application associated with the one of the respective icons, wherein the application associated with the one of the respective icons is different from the application associate with the second graphical user interface; and output, for display by the display, a graphical user interface for the application associated with the one of the respective icons.

18. The computer-readable storage medium of claim 16, wherein the instructions further cause the one or more processors to:

after outputting the graphical user interface that includes the respective icons for the plurality of applications:

receive an indication of a user input for ceasing output of the graphical user interface that includes the respective icons; and cease outputting, for display, the graphical user interface that includes the respective icons.

19. The computer-readable storage medium of claim 18, wherein the instructions that cause the one or more processors to cease outputting the graphical user interface that includes the respective icons includes instructions that cause the one or more processors to:

output, for display by the display, a lock screen graphical user interface; or output, for display by the display, an updated graphical user interface for the application.

20. The computer-readable storage medium of claim 16, wherein the second graphical user interface is a different graphical user interface for the application or a lock screen graphical user interface.

* * * * *